Jan. 7, 1936.  C. A. THOMAS ET AL  2,027,129
METHOD OF ARTIFICIALLY AGING WHISKY
Filed Sept. 12, 1934
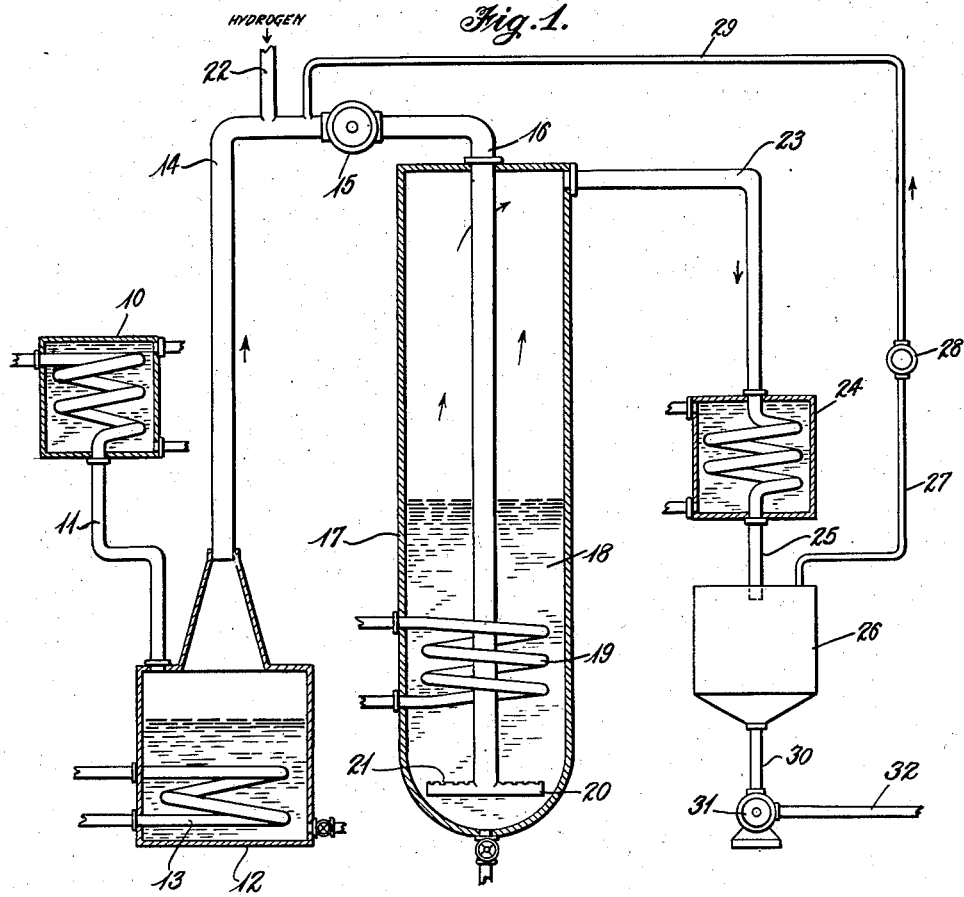
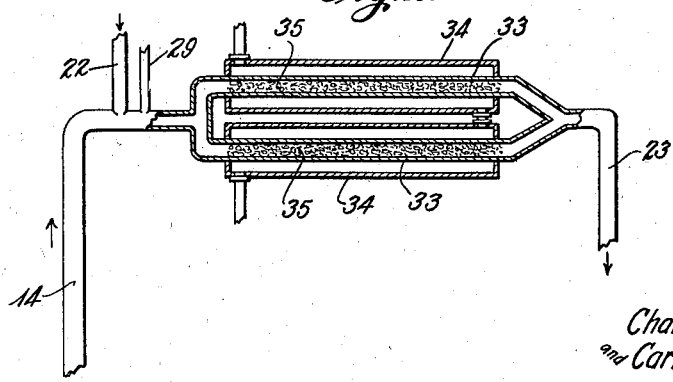
Inventors
Charles A. Thomas
and Carroll A. Hochwalt
By Bacon & Thomas
Attorneys Patented Jan. 7, 1936

2,027,129

UNITED STATES PATENT OFFICE 2,027,129

METHOD OF ARTIFICIALLY AGING WHISKY

Charles A. Thomas and Carroll A. Hochwalt, Dayton, Ohio, assignors, by mesne assignments, to Nelson S. Talbott, Dayton, Ohio Application September 12, 1934, Serial No. 743,752

16 Claims. (Cl. 202—78)

This invention relates to a method of treating green whisky, such as Bourbon or rye, and is an improvement of the process disclosed in our co-pending application Serial No. 703,154, filed December 19, 1933.

An object of the invention is to provide an improved process of treating whisky for the effective removal of undesirable taste and odors commonly known in the industry as "slop" or "green" odor.

Another object of the invention is to provide a process which removes such "slop" or "green" odors and which imparts an increased aroma to the whisky.

More specifically, an object of the invention resides in the provision of a process for hydrogenating whisky in the vapor phase in the presence of a catalyst. In the preferred embodiment, green whisky in vapor form is mixed with hydrogen and brought into intimate contact with a catalyst capable of promoting the reaction of the hydrogen with the constituents of the whisky to effect the elimination of deleterious odors and taste and improve the aroma. This step of hydrogenation may be followed by treatment of the resulting product in charred kegs or with the activated chars disclosed in our copending application above referred to in order to lend color to the whisky and still further increase the aroma thereof.

Other objects and advantages of the invention will appear in the following description of the preferred embodiment of the invention illustrated by the accompanying drawing, of which:

Figure 1 is a vertical sectional view of one form of apparatus; and

Figure 2 is a similar view of a modification of the catalytic treating chamber.

Referring more particularly to the drawing, in Figure 1, 10 indicates a condenser for liquefying the weak whisky from the primary still (not shown). The weak whisky from the condenser 10 is conducted by the pipe 11 and dropped into heated water in a doubler still 12. The water in the doubler still 12 may be heated in any known or convenient manner but is preferably heated by steam passed through the coils 13 positioned in the doubler still. The green whisky vapors from the doubler still 12 are passed through a pipe 14, blower 15, and pipe 16 into a catalytic treating chamber 17. The treating chamber 17 is partly filled with a body of water 18 heated by any convenient means, such as a steam coil 19. The water contains a finely divided catalyst such as powdered nickel in suspension. The pipe 16 extends below the surface of the water and terminates adjacent the bottom of the chamber 17 in a vapor distributing member 20 provided with a plurality of small apertures 21.

Prior to passing the green whisky vapors into the treating chamber 17, hydrogen is injected into and mixed with the vapors in the pipe 14 by means of a pipe 22 connected to a source of hydrogen (not shown). The blower 15 forces the mixed vapors and hydrogen through the pipe 16 and apertures 21 so that the mixture bubbles up through the heated water 18 in contact with the suspended catalyst. The resultant agitation of the water aids in keeping the catalyst in suspension and insures intimate contact thereof with the mixture of vapors and hydrogen. The temperature of the water is preferably maintained above the condensation temperature of the whisky vapors so that hydrogenation takes place in the vapor phase. The treated vapors and any excess hydrogen collect above the surface of the water 18 in the treating chamber 17 and are conducted by a pipe 23 to a condenser 24 where the whisky vapors are liquefied.

From the condenser 24, the excess hydrogen and liquefied whisky are conducted by pipe 25 to a hydrogen separating chamber 26 in which the hydrogen collects above the liquid whisky. The excess hydrogen is returned to the process by a pipe 27 from the upper portion of the separating chamber 26, a blower 28 and pipe 29 connecting with pipe 14 on the low pressure side of blower 15. The liquid whisky in the separating chamber 26 may be conducted by a pipe 30, a pump 31, and a pipe 32 to storage means (not shown), which may be in charred kegs in order to lend color to the whisky and further increase its aroma, or the whisky from the separating chamber 26 may be subjected to treatment by an activated char as disclosed in applicants' above mentioned co-pending application.

The green whisky vapors may be hydrogenated at temperatures ranging from the border line between liquid and vapor phase hydrogenation, which is 90 to 95° C., up to the boiling point of the water, which is approximately 100° C. The temperature of hydrogenation, however, influences the aroma and flavor of the resulting whisky. The preferred temperature is approximately 100° C. At temperatures of 90 to 95° C., the resulting product has a somewhat spicy taste and is not quite as aromatic as with the higher temperatures. At 100° C., however, this spicy taste disappears entirely and the aromatic quality of the whisky is increased. The ester content goes up approximately 25 parts per one hundred thousand, whereas the original green whisky has only around 10 to 11 parts per one hundred thousand.

It is to be noted that the pressure in the system, or at least that in the catalytic chamber 17, may be increased in order to enable the temperature in the catalytic chamber to be raised to increase the rate of reaction. This, however, introduces operating difficulties not present when substantially atmospheric pressure is used in the cataltyic chamber. Also, at temperatures above 120° C., the ester content increases to an undesirable extent.

As a specific example of the process, the green whisky vapors from the doubler still 12 may be under a pressure of approximately three pounds per square inch. The head of catalytic suspension above the distributing member 20 in the treating chamber 17 may be approximately ten feet. An excess of hydrogen is admitted into the pipe 14 by the pipe 22 so as to form a mixture with the green whisky vapors, and the pressure of the mixture is raised to approximately eight pounds per square inch by the blower 15 in order to overcome the head of catalyst suspension in the treating chamber 17. The green whisky vapors in the pipe 14 may have a temperature of 80 to 90° C., and the water 18 in the treating chamber is preferably heated to a temperature of approximately 100° C. so as to be at or near the boiling point thereof. Under these conditions the whisky vapors remain in the vapor phase while contacting the catalyst suspended in the water. The mixture of whisky vapors and hydrogen leaves the apertures 21 of the distributing member 20 in the form of small bubbles and intimately contacts the suspended catalyst.

The catalyst preferably employed is finely divided nickel having a particle size sufficiently small to remain in suspension during the treating operation and is preferably 200 mesh active nickel. While finely divided nickel is preferably used, other catalytic materials such as platinum, iron, chromium, copper oxide, or any other catalyst which is capable of effecting hydrogenation and being suspended in water, may be used and are contemplated by our process. Such catalysts apparently carry a small amount of adsorbed oxygen since slight oxidation resulting in the formation of aldehydes also occurs during the hydrogenation process. The time of reaction during which the whisky vapor and hydrogen are subjected to contact with the catalyst will vary with the catalyst and cannot be definitely stated. It will be apparent, however, to those skilled in the art that the vapors must be maintained in contact with the catalyst a sufficient length of time to remove the deleterious odors and taste and increase the aroma of the whisky to the desired extent.

In Figure 2 is shown a different form of catalytic treating device for effecting vapor phase hydrogenation of green whistky in which the same reference characters are used for portions of the apparatus which are identical with those of the modification shown in Figure 1. In this modification the pipe 14 from the doubler still has connected thereto the hydrogen inlet pipe 22 and hydrogen return pipe 29 and leads directly to a plurality of treating chambers 33.

The treating chambers 33 are shown in duplicate in order to increase the amount of vapor which may be treated, but it is to be understood that a single treating chamber may be provided if it has sufficient capacity to treat the vapors coming from the still or, if necessary, a larger number of treating chambers may be employed. The treating chambers 33 are preferably surrounded by heating jackets 34 so as to enable the treating chambers to be kept at any desired temperature and steam is the heating medium preferably employed. The treating chambers 33 contain a catalyst capable of promoting hydrogenation of the green whisky vapor, preferably in finely divided form and supported by an inert material 35.

After passing through the treating chambers 33, the treated vapor and excess hydrogen are conducted through the pipe 23 to the hydrogen separating chamber 24 of Figure 1. From the separating chamber, the hydrogen is returned to the process as described with respect to Figure 1. The hydrogenated whisky may then be further treated in charred kegs or with activated char, as also described with respect to the modification shown in Figure 1.

The catalyst also preferably used in this modification of the process is finely divided nickel. The finely divided catalyst is packed with a porous body of inert material such as asbestos, charcoal, coke, pumice stone, or any other porous inert material. This packing acts as a support for the finely divided nickel, which is preferably a two hundred mesh active nickel, and the catalyst is thoroughly distributed over the inert carrier and rests on the surface and in the pores of the material. Besides this supporting function, the carrier also acts to baffle and agitate the vapors, thus affording repeated and intimate contact with the catalyst while in the treating chamber.

While finely divided nickel is preferably used as the catalyst in this modification, the other catalytic materials such as the platinum, iron, chrominum, or copper oxide before mentioned, or any other catalyst which has the capability of effecting hydrogenation, may be and are contemplated by our process. As hereinbefore stated, such catalysts carry a small amount of adsorbed oxygen. Also in this modification of the process the time of reaction during which the whisky vapor and hydrogen are subjected to contact with the catalyst cannot be definitely stated since it will vary with the catalyst used and the temperature of the treating zone. For the same reasons as in the first described modification of the process, the necessary time of reaction will be apparent to those skilled in the art.

In this modification of the process, the green whisky vapors may be hydrogenated at temperatures ranging from the border line between liquid and vapor phase hydrogenation, that is, 90 to 95° C. up to 150° C. The preferred temperature is, however, approximately 120° C. At temperatures of 90 to 95° C., the resulting product has a somewhat spicy taste and is not quite as aromatic as with higher temperatures. With temperatures between 100 and 120° C., however, this spicy taste disappears and the aromatic quality of the whisky is increased. As stated with reference to the modification of Figure 1, the ester content goes up to approximately 25 parts per one hundred from the 10 to 11 parts per one thousand in the original green whisky. Because of greater speed of reaction, the upper limit of this range (approximately 120° C.) is preferred.

At temperatures above 120° C. the ester content increases quite rapidly, and at hydrogenation temperatures of 150 to 160° C. the resultant product is full of esters and resembles a brandy more than a whisky. Also at these temperatures the aldehydes develop to a point where they become objectional.

As hereinbefore stated, the present invention is an improvement over the liquid phase process of our above mentioned copending application, and the vapor phase hydrogenation product is better in every way than the liquid phase product. The ester content is raised considerably, and the spicy taste which always occurs with liquid phase hydrogenation is absent when the green whisky vapors are hydrogenated in the vapor phase. The product has a more whisky-like odor and taste so that when followed by the second step either by treatment with the activated char disclosed in our copending application above referred to, or by aging in a charred barrel, the product represents a very potable whisky. By the vapor phase treatment of the present invention the aldehydes are increased slightly, which is a desirable feature as they help to increase the aroma and taste of the whisky. This is probably caused by a small percentage of adsorbed oxygen on the nickel catalyst, and even though the reaction is carried on in a reduction atmosphere of hydrogen, nevertheless some oxidation occurs, causing formation of aldehydes. By maintaining the temperature of hydrogenation between approximately 100 and 120° C., the quantities of aldehydes formed are not objectionable to the whisky although if the temperature of hydrogenation is too high, too large a quantity of them forms, which makes the whisky objectionable. Furthermore, the vapor phase process of hydrogenating green whisky does not interfere in any way with the regular distilling operations but is carried on as a continuous step in such distilling operations. If desired a portion only of the green whisky vapors from the doubler still may be diverted to the hydrogenation process and the remaining portion subjected to the conventional processes.

While we have described our process of vapor phase hydrogenation in connection with a distilling operation, it is to be understood that the improved results from vapor phase hydrogenation may be accomplished by injecting liquid green whisky not taken directly from a still into heated water and the resultant vapors passed through the vapor phase hydrogenation step. The process may also be performed by directly heating liquid green whisky and passing the evolved vapors through the hydrogenation step. This last mentioned modification, however, has the disadvantage that the first vapors evolved consist mainly of alcohol and the last vapors are principally water and that some of the solids present in the green whisky remain in the heating chamber. If all the condensate from the last mentioned is collected in the same receiver, however, the resulting product represents substantially all of the whisky.

While we have described the preferred embodiment of our invention, it is understood that the details of the invention may be varied within the scope of the following claims.

We claim as our invention:

1. The method of artificially aging whisky to improve its odor and taste, which comprises, the step of passing said whisky in vapor phase with hydrogen over a hydrogenating catalyst, and maintaining said whisky in vapor phase during the treatment thereof with said hydrogen and catalyst.

2. The method of artificially aging whisky to improve its odor and taste, which comprises, treating the same in vapor phase with hydrogen in the presence of a hydrogenating catalyst, and maintaining said whisky in vapor phase during the treatment thereof with said hydrogen and catalyst.

3. The method of artificially aging whisky to improve its odor and taste, which comprises, the steps of introducing it to a zone containing boiling water, leading the vapors thus generated to a hydrogenating zone where they are treated in the presence of hydrogen, and a hydrogenating catalyst and in finally condensing the thus treated product.

4. The method of artificially aging green whisky to improve its odor and taste, which comprises, treating the same in vapor phase with hydrogen in the presence of the hydrogenating catalyst at a temperature of from about 95° C. to about 150° C., and maintaining said whisky in vapor phase during the treatment thereof with said hydrogen and catalyst.

5. The method of artificially aging green whisky to improve its odor and taste, which comprises, passing the whisky in vapor phase and in admixture with hydrogen over a hydrogenating catalyst maintained at a temperature of approximately 120° C.

6. A process for artificially aging green whisky to improve its odor and taste, which comprises, converting the whisky into a vapor of uniform composition by continuously depositing the liquor onto a body of water maintained at the distillation temperature of the whisky, adding hydrogen to the resultant vapors and passing the vaporous mixture thus formed into contact with a hydrogenating catalyst maintained at a temperature adequate to react the hydrogen with constituents of the vaporized whisky, subsequently condensing the thus treated whisky vapors, and separating the resultant condensate from excess hydrogen.

7. In a process of artificially aging whisky to improve its odor and taste, the step which comprises, contacting whisky vapors with finely divided nickel in the presence of hydrogen, and maintaining the alcohol of said whisky in vapor phase while in contact with said nickel.

8. In a process of artificially aging whisky to improve its odor and taste, the step which comprises, contacting a mixture of whisky vapor and hydrogen with a finely divided catalyst capable of promoting a hydrogenizing reaction while said catalyst is supported by an inert porous material, and maintaining said whisky in vapor phase while in contact with said catalyst.

9. In a process of artificially aging whisky to improve its odor and taste, the steps which comprise, passing green whisky vapors and hydrogen through a treating zone containing finely divided nickel supported by an inert porous material and maintaining said zone at a temperature of substantially 120° C, and maintaining said whisky in vapor phase while in said treating zone.

10. In a process of manufacturing whisky wherein said whisky is artificially aged to improve its odor and taste, the steps which comprise, distilling said whisky, mixing hydrogen with the evolved whisky vapors to form a mixture of hydrogen and whisky vapors, continuously passing said mixture through a treating zone maintained at a temperature above the liquefication point of said vapors and containing a catalyst capable of promoting a hydrogenating reaction, and condensing said vapors.

11. In a process of manufacturing whisky wherein said whisky is artificially aged to improve its odor and taste, the steps which comprise, distilling said whisky, mixing hydrogen with the evolved whisky vapors to form a mixture of hydrogen and whisky vapors, passing said mixture through a treating zone maintained at a temperature above the liquefication point of the vapors and containing a catalyst capable of promoting a hydrogenating reaction, condensing said vapors, and subjecting the thus deoderized whisky to treatment with charred wood containing alcohol solubles and continuing such treatment until the whisky has been sufficiently aged by said solubles.

12. The method of artificially aging green whisky to improve its odor and taste, which comprises, the steps of treating the green whisky with a finely divided hydrogenating catalyst, in deodorizing the green whisky by reacting the odoriferous constituents of the whisky in the vapor phase with hydrogen in the presence of the hydrogenating catalyst while maintaining the same under pressure sufficient to maintain chemical hydrogenation of the odoriferous constituents in a substantially non-oxidizing atmosphere, continuing the hydrogenation reaction under said substantially non-oxidizing atmosphere until the green whisky has been substantially deodorized, maintaining said whisky in vapor phase while in the presence of said catalyst, and subjecting the thus deodorized whisky to treatment with charred wood containing alcohol solubles and continuing such treatment until the whisky has been sufficiently aged by said solubles.

13. The method of artificially aging whisky by hydrogenating said whisky to improve its odor and taste, which comprises, bubbling a mixture of whisky vapors and hydrogen through a body of water having a finely divided catalyst suspended therein, and maintaining the temperature of the water sufficiently high to keep the alcohol of the whisky in vapor phase during said hydrogenating.

14. The method of artificially aging whisky by hydrogenating said whisky to improve its odor and taste, which comprises, contacting a mixture of whisky vapors and hydrogen with a catalyst in the presence of water at a temperature above the condensation point of the vapors so as to maintain the alcohol of the whisky in vapor phase during said hydrogenating.

15. The method of artificially aging whisky by hydrogenating said whisky to improve its odor and taste, which comprises, introducing a mixture of whisky vapors and hydrogen into a treating zone and bubbling said mixture through a body of water containing a finely divided catalyst, and maintaining said water at the boiling temperature of the water at the pressure in said zone so as to maintain the alcohol of the whisky in vapor phase during said hydrogenating.

16. The method of artificially aging whisky by hydrogenating said whisky to improve its odor and taste, which comprises, contacting a mixture of whisky vapors and hydrogen with a catalyst in the presence of water at a temperature of approximately 100° C, and maintaining the alcohol of said whisky in vapor phase during said hydrogenating.

CHARLES A. THOMAS.
CARROLL A. HOCHWALT.